Figure 1:
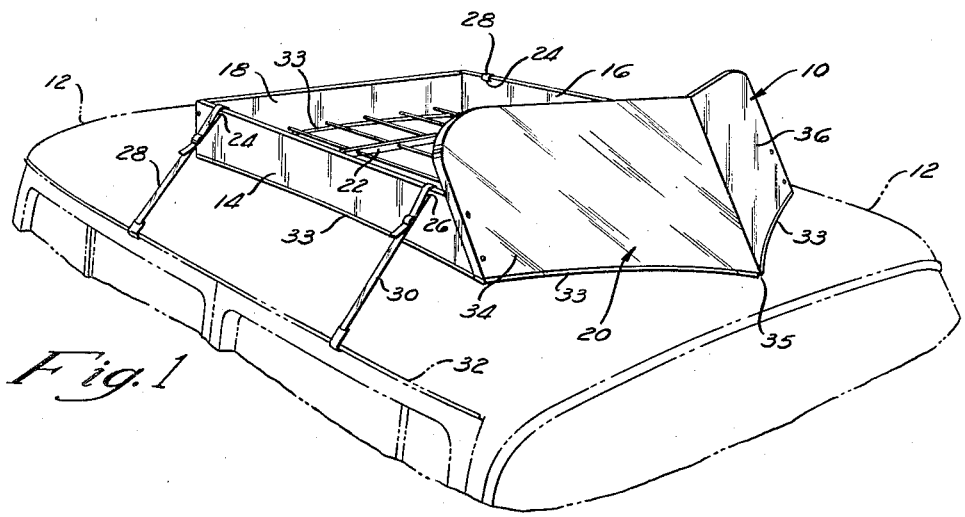

Nov. 24, 1959 W. L. HORNKE 2,914,231
LUGGAGE CARRIER FOR AUTOMOBILES
Filed Nov. 18, 1957 3 Sheets-Sheet 1

INVENTOR.
WILLIAM L. HORNKE
BY
RICHEY, WATTS, EDGERTON,
McNENNY & FARRINGTON
Karl A. Ohralik
ATTORNEYS

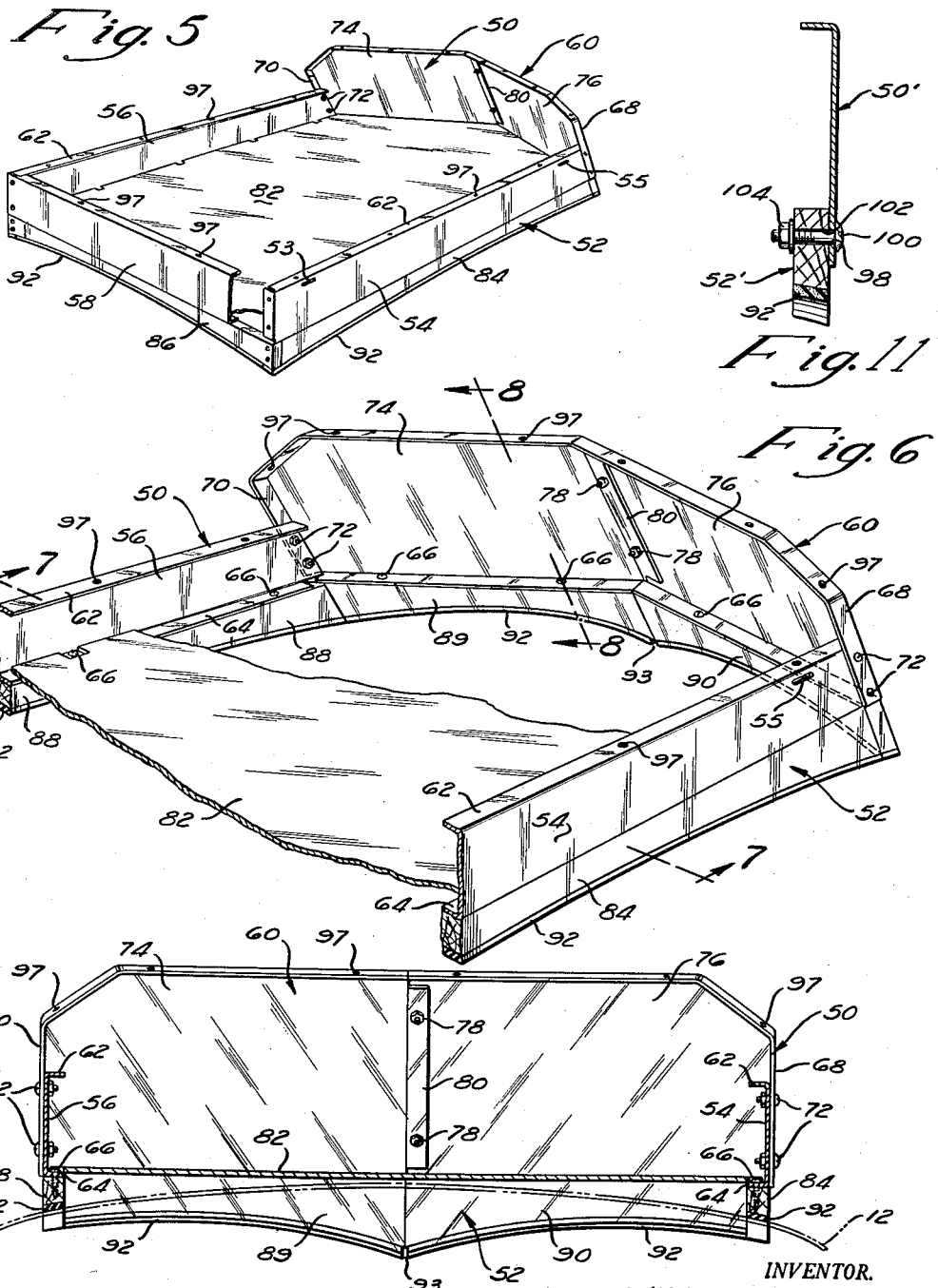

Nov. 24, 1959 W. L. HORNKE 2,914,231
LUGGAGE CARRIER FOR AUTOMOBILES
Filed Nov. 18, 1957 3 Sheets-Sheet 3
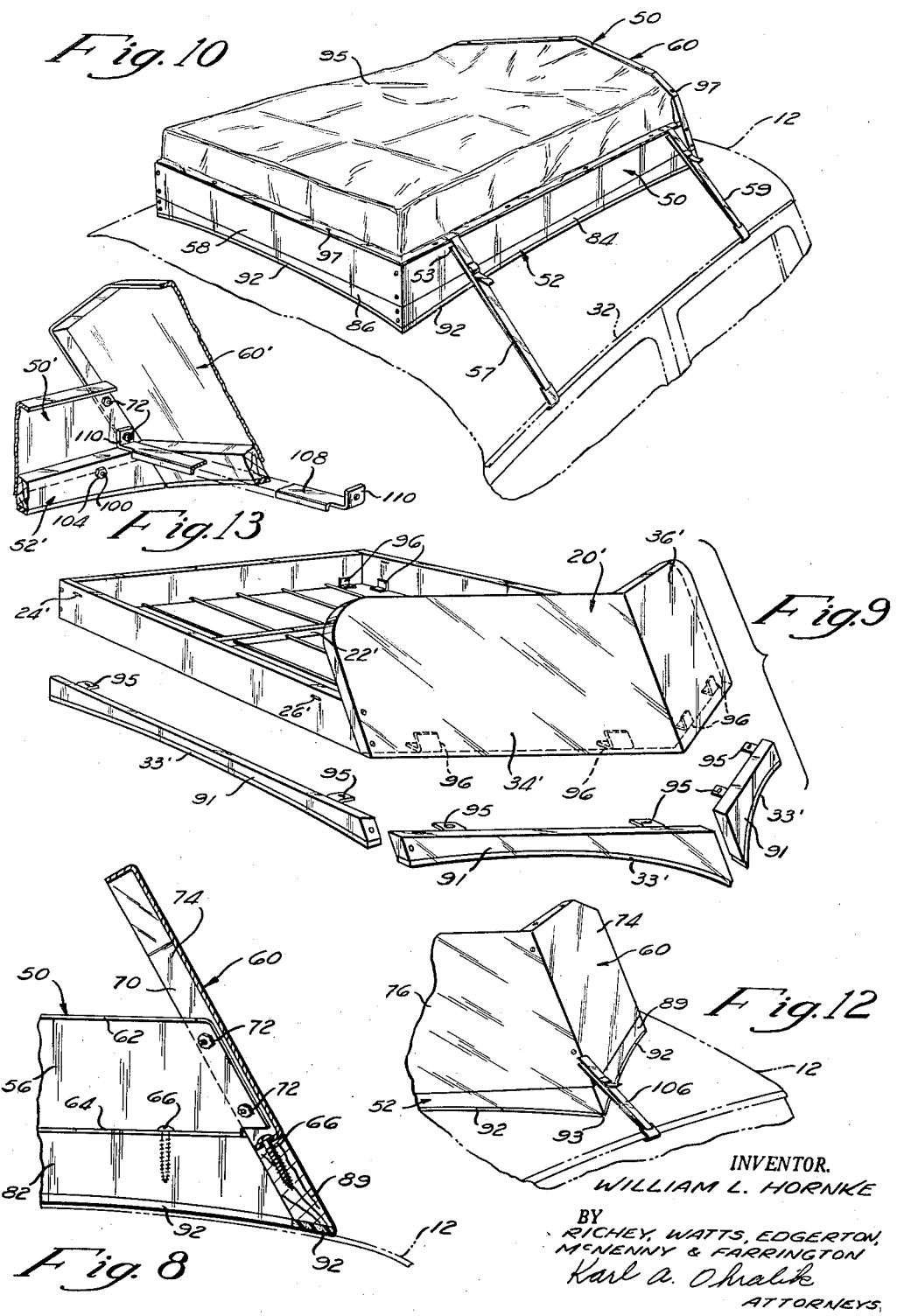
INVENTOR.
WILLIAM L. HORNKE
BY RICHEY, WATTS, EDGERTON,
McNENNY & FARRINGTON
Karl A. Ohralik
ATTORNEYS United States Patent Office 2,914,231
Patented Nov. 24, 1959

2,914,231

LUGGAGE CARRIER FOR AUTOMOBILES

William L. Hornke, Maple Heights, Ohio

Application November 18, 1957, Serial No. 697,169

6 Claims. (Cl. 224—42.1)

This invention relates to automobile luggage carriers and more particularly to automobile luggage carriers adapted for roof mounting.

In long distance automobile travel it is frequently advantageous to have luggage space in addition to that normally provided in the trunk or interior of an automobile. Use of space in the tonneau as such additional space may be satisfactory in some cases but it is usual that such use of tonneau space is a burdensome encroachment on passengers rendering a trip uncomfortable and tiresome to the passengers.

In the past it has been found advantageous to utilize the roof of automobiles for mounting auxiliary luggage carriers. While these prior arrangements have been successful in large measure in alleviating the problem of carrying luggage on automobile trips, the same have in many cases been deficient as being of cumbersome and awkward box-like design and construction, mounted relatively high above the roof of the automobile. When mounted on an automobile roof and transported at a high rate of speed as commonly traveled, such a carrier with a blunt forward wall presents considerable wind resistance to the travel of the automobile thereby creating excessive noise and appreciably adversely affecting the gasoline economy of travel. In addition a high silhouette encountering cross-winds is very likely to cause dangerous "drift" by the automobile on the highway and impose strain upon the driver.

In addition to the foregoing, in the mounting of the mentioned carriers and various other prior roof mounted luggage carriers having clearance from the automobile roof, it has been necessary to take unusual precautions to prevent the same from being blown loose from its mounting during high speed travel. While this hazard is ever present to some degree, the compression of air beneath and rarefaction of air above such carriers during high speed travel has been effective in reducing the frictional engagement of the carrier with the automobile roof, rendering the same increasingly susceptible to removal by air resistance.

Accordingly, it is an object of this invention to provide an automobile luggage carrier that is free of the aforementioned defects and that is spacious, of rigid construction, easily assembled and disassembled for storage purposes, attractive in appearance, complimentary to the varying styles and models of automobiles, inexpensive to manufacture and economical in upkeep. In accordance with the construction of this invention the engagement of roof mounted luggage carrier increases with speed of the automobile to render the same more stable and secure. The clearance between the automobile roof and the bottom of the carrier is totally eliminated all about its periphery to avoid air currents therebeneath and thereby to provide a low silhouette that is less affected by cross winds. A forward shield having surfaces disposed at compound, inclined angles reduces wind resistance against the carrier and protects the luggage against wind, insects, rain and other foreign matter.

A further object of this invention is to provide a luggage carrier of basic, standard size and design but with interchangeable peripheral roof engaging members thereby enabling the economical interchange of these members only, to accommodate different roof surface contours as styling changes are made in automobiles from year to year or may exist between automobile makes, thereby eliminating the necessity of replacement of an entire luggage carrier.

Figure 2:
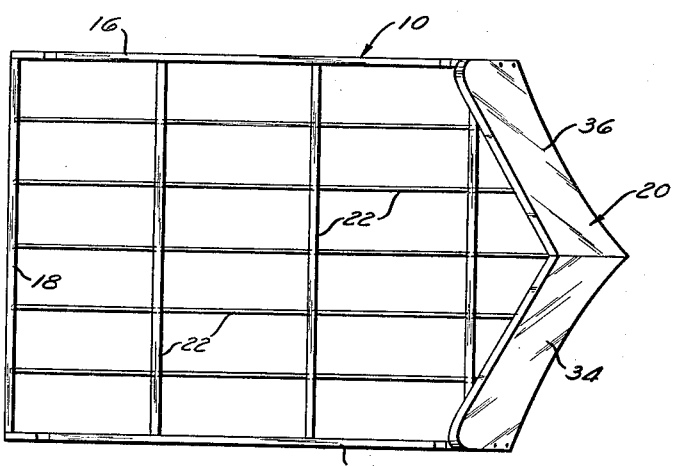
Figure 4:
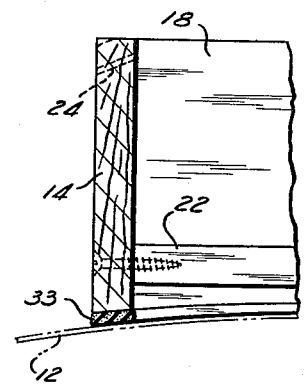
Figure 3:
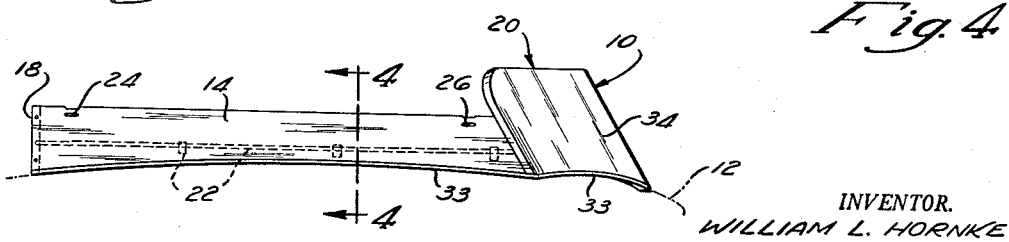

Other and further objects and advantages of this invention will become apparent from a detailed description thereof considered with the accompanying drawing in which:

Figure 1 is a front perspective view of a luggage carrier according to the invention in mounted position on an automobile roof, Figure 2 is a plan view of the luggage carrier of the invention shown in Figure 1, Figure 3 is a side, elevational view of the luggage carrier shown in Figures 1 and 2, Figure 4 is a sectional elevation of the luggage carrier taken along section 4—4 of Figure 3, Figure 5 is a rear perspective view, partially broken away, of a luggage carrier according to a modified form of the invention, Figure 6 is an enlarged perspective view broken away and illustrating the luggage carrier shown in Figure 5, Figure 7 is a rear elevational view taken along section 7—7 of the luggage carrier shown in Figure 6, Figure 8 is a fragmentary and sectional view taken along section 8—8 of the luggage carrier shown in Figure 6, Figure 9 is an exploded, perspective view of still another embodiment of luggage carrier, Figure 10 is a perspective view of the luggage carrier of Figures 5 through 9 as applied to the roof of an automobile and prepared for travel, Figure 11 is a fragmentary and sectional side elevation of the luggage carrier illustrating an alternative manner of securing certain parts thereof, Figure 12 is a fragmentary view in perspective of a forward portion of the invention illustrating an additional attachment for the luggage carrier, and Figure 13 is a fragmentary view in perspective of a spacing and strengthening member fixedly securing and spacing the forward ends of the carrier.

Referring now more particularly to Figures 1 through 4 illustrating one form of the invention, 10 represents generally the entire luggage carrier structure which is adapted to be applied to an automobile partially shown in phantom at 12. The structure of carrier 10 includes a pair of planar side walls 14 and 16, a rear wall 18 extending between and secured to the side walls and a forward, bipartite shield 20 extending between the forward ends of walls 14 and 16. These walls and shield form an enclosure in which a planar grate type floor member 22 comprising a plurality of cross pieces extending between and secured at respective ends to walls 14 and 16 and a plurality of longitudinal pieces extending between and secured at respective ends to rear wall 18 and shield 20. Floor member 22 provides a planar surface for stably supporting luggage having planar surfaces.

For securing carrier 10 in place on an automobile roof, each of side walls 14 and 16 is provided with a pair of spaced slit type apertures as shown at 24 and 26 in wall 14 for receiving straps 28 and 30 attachable to a water channel 32, or moulding at one end, and to the wall at the other end.

As a feature of this invention, the bottom edges of each of the walls 14, 16, and 18 are curved to conform to the roof of an automobile to which the carrier may be applied and a cushion or a liner 33, of a suitable soft material with high coefficient of friction applied to the bottom edge of each of the walls and shield to prevent scratching or defacing of the automobile roof finish and assuring uniform peripheral contact throughout to accommodate any minor imperfections in the roof or the base contours. The liner 33 is preferably of sponge rubber, but may be a suitable plastic or other material. The tight fit of the carrier against the roof prevents admission of air or wind beneath the carrier or luggage and further provides a tight bottomed container for retaining small articles that may fall beneath the floor 22 or may intentionally be placed beneath this floor. It is also to be noted that the large surface area at the bottom of the luggage carrier engageable with the automobile roof provides a well distributed load on the automobile roof preventing localized stresses thereon and effects an improved frictional engagement between the carrier and automobile.

As still another feature of the invention, shield 20 comprises a pair of planar sections 34 and 36 joined together to form a dihedral angle therebetween. Each of the planar sections 34 and 36 is obliquely disposed and extends from its attachment to the respective wall 14 and 16 forwardly and transversely to the junction of the sections. Each of the sections 34 and 36 is also tipped backwardly at its upper side to provide streamlining to the carrier to minimize wind resistance thereto in high speed travel. The liners 33 attached to each section 34 and 36 of shield 20 are shortened slightly to provide a small space 35 therebetween at the vertex of 34 and 36 to permit drainage of any water that may accumulate within the carrier. In most cases, this space is the lowermost point of the carrier whereby accumulation of water within the carrier is prevented. In the event that another point of the carrier should be lower, an appropriate space may be provided at another junction as, for example, at one rear corner of the carrier to effect the same drainage.

The carrier shown in Figures 1 through 4 although being of unique construction is simple and inexpensive in manufacture, installation and upkeep. The various parts of the carrier such as the walls and shield may be made of wood or other inexpensive and durable material.

In accordance with another embodiment of invention as shown in Figures 5 through 8 and 10 through 12 of the drawings, provision is made for adaptation of the luggage carrier of the invention to automobiles of various and different roof shapes and contours whereby the body portion of the carrier as shown generally at 50 may be detachably secured to a base represented generally at 52. By the provision of several bases such as base 52, of various roof engaging edge contours conformable to varying automobile roofs, the body 50 may be applied to the different automobile roofs.

Body portion 50 includes side walls 54 and 56, each detachably secured to a rear wall 58 and to a forward bi-partite shield 60. The lower edges of each of the walls and shield 60 lie in a plane and the height of each wall is substantially the same to provide an enclosure of uniform height. Each of the walls 54 and 56 is provided with a pair of spaced slit-type apertures as shown at 53 and 55 to facilitate attachment of a pair of straps 57 and 59 to secure the carrier to the automobile roof. According to this embodiment of the invention, walls 54, 56 and 58 and shield 60 are preferably constructed of light gauge sheet metal flanged along each edge to provide durability thereto and to adapt the same for facile attachment to and detachment from base 52 in a manner about to be described.

As shown more clearly in Figures 6 and 7, walls 54 and 56 are provided with upper flanges 62 and lower flanges 64 having a plurality of apertures spaced along its length for receiving a like plurality of screws 66 adapted to threadedly engage base 52 and secure the walls thereto. Similarly the shield 60 is provided with lower apertured flanges for receiving suitable screws 66 to secure the walls and shield to base 52.

To provide a stronger and unitary structure of body 50, the forward ends of walls 54 and 56 are secured to flanges 68 and 70 of shield 60 by nut and bolt combinations as shown at 72, the bolts of which extend through apertures in the flanges and through aligned apertures in the side walls.

For simplicity in construction and storage, shield 60 comprises a pair of planar sections 74 and 76 each secured along one side to the other by nut and bolt combinations 78, the bolts of which extend through the edge of section 76 and a flange 80 of section 74 offset somewhat from the plane of section 74. In an assembled condition, sections 74 and 76 of shield 60 comprise a streamlined forward surface extending backward at its lateral and upper portions.

According to this embodiment of invention a floor 82 of any suitable material such as plywood, wire mesh, or sheet metal and formed to be supported about its periphery by the lower flanges of walls 54, 56, and 58 and shield 60 may be provided. Floor 82 may merely rest on these flanges or as an alternative, may be secured thereto or to base 52 by suitable screws extending through apertures in the floor and aligned with apertures in the flanges and the base 52.

Base 52 is preferably constructed of wood for the economical reproduction of varying roof contours, and comprises five sections 84, 86, 88, 89 and 90 removably joined at their ends to form a rectangular enclosure congruent with body portion 50. As explained hereinabove, the body 50 is detachably secured to the base 52 along the upper edge of the base. The lower edge of the base is curved to conform to the roof of any specific make of automobile and is provided with a roof engaging liner 92 of high coefficient of friction to prevent damage to the roof finish and to increase the frictional engagement with the roof. In a manner similar to that described with respect to liner 33, the portions of liner 92 along the lower edge of sections 89 and 90 are shortened to provide a drainage space 93.

It is to be observed that the embodiment of the invention shown in Figures 5 through 8 and 10 through 12 is advantageous over prior art luggage carriers in similar respects to the carrier of Figures 1 through 4 and incorporates additional features of improvement. In accordance with this modified form of invention, a body portion 50 is adaptable to virtually any automobile roof by cooperation with a base such as 52 adapted to a particular automobile. By the provision of a succession of bases having lower edge portions adaptable to automobile roofs of different styles and contours, the carrier may be applied to a succession of new models of automobiles with a minimum of expense and difficulty. As a still further feature of improvement, the embodiment of carrier illustrated in Figures 5 through 8 and 10 through 12 is detachable into a plurality of generally planar component parts, facilitating storage and transportation of the same.

In accordance with another modification as illustrated in Figure 9 of the drawings, a carrier having a body structure and construction similar to that shown in Figures 1 through 4 is provided. Similar parts are indicated by the same numbers primed in this figure. The attachment of the body of the carrier to the base thereof is facilitated by apertured lugs 95 on each of the component parts of the base members 91 and on the body at 96 in positions corresponding to the positions of the lugs on the base. Suitable bolts may be extended through aligned apertures on the lugs and nuts engaging the bolts may be provided to establish a tight fit between the lugs.

As clearly shown in Figures 5, 6 and 10 of the drawings, provision is made for quick and easy attachment or detachment of a cover 95 or other suitable means for securing the luggage in place. A plurality of apertures are spaced along the upper flanges of the walls and shield as shown at 97 that may be utilized to anchor the ends of cord to secure the cover or alternatively to hold down the luggage itself. As another alternative, suitable snaps may be provided along the flanges for cooperation with snap sockets in the cover to secure the same.

In accordance with still another modification as illustrated in Figure 11 of the drawings and similar to the embodiment of invention shown in Figures 5 and 6, the attachment of the body 50' to the base 52' of the invention may be established without a flange or lugs wherein the lower portion of each of the walls and shield parts is coplanar with the wall or shield, as the case may be, and is apertured as at 98 to receive bolts 100 extending through the wall end and through an aperture 102 in the base. A tight engagement between the wall and base is established by a nut 104 tightly threaded on the bolt 100.

As shown in Figure 12 of the drawings, provision is made for assuring secure contact of the carrier with an automobile roof of flat or more nearly planar contour. In such circumstances, a strap 106 is secured at one end to a forward portion of shield 60 and is attachable at the other end to the forward windshield molding of the automobile. Even during high speed travel the strap provides sufficiently tight engagement between the carrier and automobile roof to overcome wind resistance tending to unseat the same.

In accordance with another feature of the invention as shown in Figure 13, a rigid strut 108 may be provided for connection between the forward ends of the side walls of the carrier to maintain a constant spacing therebetween. In this figure the strut is applied to the embodiment of invention shown in Figure 11, it being understood that the same is equally applicable to the embodiment of invention shown in Figures 5 through 10 and 12. The strut 108 is preferably an "angle" member composed of a pair of sides disposed at right angles to each other to provide rigidity thereto and is provided with an apertured flange 110 at each end. The aperture of each flange receives the bolt of the lower nut and bolt combination 72 therein and the nut is tightened on the bolt to tightly secure the flange and therefore the strut in place. By the provision of such strut, the spacing between the forward ends of the sides is fixed against expansion or contraction and stresses that may otherwise be imposed on the shield 60' in certain situations are avoided. It is, of course, clear that such a strut may also be used to advantage for maintaining proper spacing between parts of the carrier during assembly thereof.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. An open-top luggage carrier for automobiles comprising a base section and a body section, said base section comprising a wooden frame having a pair of spaced rigid side members extending longitudinally of the automobile, said side members having their lower edges curved to conform to the curvature of the automobile top and having straight upper edges, said base section frame having a rigid end member secured between said side members at one end of said side members, said end member having its lower edge curved to conform to the automobile top and a straight upper edge co-planar with the upper edges of said side members, said base section frame having a pair of diverging members secured to each other and to said side members remote from said end member, said diverging members having their lower edges curved to conform to the top of the automobile and having their upper edges straight and co-planar with said side members, said body section comprising a metal frame having a pair of flanged members mounted on the upper edge of the side members of said base section, said body section having a rigid flanged member mounted on the end member of said base section, a pair of diverging metal shield sections mounted on the upper edge of said diverging members of the base section, said diverging shield sections being secured to each other and to the flanged members at each side of the body section, and a floor mounted on said base section within said flanged members.

2. An open-top luggage carrier for automobiles comprising a base section and a body section, said base section comprising a generally rectangular wooden frame having a pair of spaced rigid side members extending longitudinally of the automobile, said side members having their lower edges curved to conform to the curvature of the automobile top and having straight horizontal upper edges, said base section frame having a rigid end member secured between said side members adjacent the rear of the automobile, said end member having its lower edge curved to conform to the automobile top and a straight upper edge co-planar with the upper edges of said side members, said base section frame having a pair of diverging members secured to each other and to said side members at the end of the frame adjacent the front of the automobile, said diverging members having their lower edges curved to conform to the top of the automobile and having straight upper edges co-planar with the upper edges of said side members, said body section comprising a metal frame having a pair of spaced flanged members mounted on the upper edge of the respective side members of said base section, said body section having a rigid flanged member mounted on the end member of said base, a pair of diverging metal shield sections mounted on the upper edge of said diverging members of the base section, said diverging shield sections being secured to each other and to the flanged members at each side of the body section, and a floor mounted on said base section within said flanged members.

3. An open-top luggage carrier for an automobile top curved in two directions comprising a base section and a body section, said base section comprising a pair of spaced wooden side members, a wooden end member disposed between said side members and a pair of diverging forward members arranged between said side members, the lower edges of said base section members being curved to conform to the top of the automobile, said body section comprising a pair of flanged metal members mounted on the side members of the base section, a transverse metal frame member secured to the base section and extending across the carrier, said side members and said last-named metal member being secured to each other and to the base section, a pair of metallic shields arranged at the forward end of the carrier, each of said shields having a portion along its lower end secured to the base section, said shields being secured to each other and to the side flanged members forming the body section, and a floor mounted within said metal members and being supported on the upper edge of each of said wooden members.

4. An open-top luggage carrier for an automobile top curved longitudinally and transversely comprising a base section and a body section, said base section comprising a pair of spaced wooden side members, a wooden rear end member disposed between said side members and a pair of diverging forward members arranged between said side members, the lower edges of said base members being curved to conform to the top of the automobile, said body section comprising a pair of rigid metal members mounted on the side members of the base section, each of said metal members having upper flanges, a transverse rear metal frame member secured to the base section wooden end member and extending across the carrier at the rear thereof, said side members and said last-named member being secured to each other and to the base section, a pair of metallic shields arranged at the forward end of the carrier, each of said shields having a portion along its lower end secured to the base section, each of said shields extending upwardly above said members of the body, said shields being secured to each other and to the side members of the body section, and a floor mounted within said body section.

5. An open-top luggage carrier for automobile tops comprising a wooden base section, said base section having spaced side members extending longitudinally of the vehicle, a transverse end member secured to one end of each of said side members, a pair of diverging frame members at the forward end of the carrier, said diverging frame members being secured to each other centrally of the carrier and having the outer ends of said diverging members secured to the longitudinal frame members of the base section, the lower edges of each of the frame members forming the base section being curved to conform to the curvature of the vehicle top, a body section comprising a pair of metal side members having a length corresponding to the longitudinal wooden members forming the base section and being secured thereto, a transverse metal member joining the rear ends of each of said side members, a metal shield having a height greater than the height of said side members mounted on the diverging frame members of the base section and being secured to said side members, a flat floor having its edges at opposite sides of the floor supported on said wooden base section, said floor having a forward portion to conform to said diverging frame members and being supported at the lower edge of said shields by said diverging members of said base section.

6. An open-top luggage carrier for automobile tops comprising a wooden base section, said base section having spaced horizontal side members extending longitudinally of the vehicle, a transverse rear end member secured to each of said side members adjacent the rear of the vehicle, a pair of diverging frame members at the forward end of the carrier, said diverging frame members being secured to each other centrally of the carrier and having the outer ends of said diverging members secured to the frame side members at the forward end of the base section, the lower edges of each of the frame members forming the base section being curved to conform to the curvature of the vehicle top, the upper edges of said frame members being straight and co-planar, a body section comprising a pair of metal side channels having a length corresponding to the side members forming the base section and being secured thereto, a rear transverse channel joining the side channels, a sloping metal shield at the forward end of the body section having a height greater than the height of said side channels, said shield being mounted on the diverging frame members of the base section and being secured to said side channels and a flat floor member having its edges at opposite longitudinal sides of the floor supported within said channels.

References Cited in the file of this patent

UNITED STATES PATENTS

| | | |
|---|---|---|
| 2,597,656 | Martin | May 20, 1952 |
| 2,654,516 | Edwards | Oct. 6, 1953 |
| 2,659,464 | Sweetman | Nov. 17, 1953 |

FOREIGN PATENTS

| | | |
|---|---|---|
| 995,858 | France | Aug. 22, 1951 |